(12) United States Patent
Akazawa (10) Patent No.: US 11,256,352 B2
(45) Date of Patent: Feb. 22, 2022

(54) IMAGE FORMING APPARATUS

(71) Applicant: CANON KABUSHIKI KAISHA, Tokyo (JP)

(72) Inventor: Minoru Akazawa, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/894,342

(22) Filed: Jun. 5, 2020

(65) Prior Publication Data

US 2020/0393927 A1 Dec. 17, 2020

(30) Foreign Application Priority Data

Jun. 13, 2019 (JP) .............................. JP2019-110635

(51) Int. Cl.

| G06F 3/041 | (2006.01) |
| G06F 3/044 | (2006.01) |
| G06F 1/3234 | (2019.01) |
| H04M 1/00 | (2006.01) |
| H04N 1/00 | (2006.01) |

(52) U.S. Cl.
CPC .......... *G06F 3/0412* (2013.01); *G06F 1/3265* (2013.01); *G06F 3/044* (2013.01); *H04N 1/00411* (2013.01)

(58) Field of Classification Search
CPC .... G06F 1/3265; G06F 3/0412; G06F 3/0416; G06F 3/0418; G06F 3/044; G06F 3/0488; G06F 3/04886; H04N 1/00411

USPC .................................................. 345/173–174
See application file for complete search history.

(56) References Cited

U.S. PATENT DOCUMENTS

| 10,282,081 B2 * | 5/2019 | Park ..................... G06F 3/04883 |
| 2013/0038544 A1* | 2/2013 | Park ....................... G06F 3/0481 345/173 |
| 2014/0184471 A1* | 7/2014 | Martynov ............. G06F 3/0481 345/1.2 |
| 2017/0220842 A1* | 8/2017 | Thompson ....... H04N 5/232411 |
| 2018/0316815 A1* | 11/2018 | Douthat ............... G06Q 20/206 |
| 2019/0364159 A1* | 11/2019 | Saeda ................. H04N 1/00225 |

FOREIGN PATENT DOCUMENTS

JP 2017-199101 11/2017

\* cited by examiner

*Primary Examiner* — Kwin Xie
(74) *Attorney, Agent, or Firm* — Venable LLP (57) ABSTRACT

An image forming apparatus includes an image forming portion for forming an image on a sheet; a display portion that displays a predetermined display for accepting, through touch operation, start of a predetermined operation of the apparatus; a position detector that detects a touched position when the touch operation is carried out; and a controller that controls the predetermined operation on the basis of the touched position detected by the position detecting portion. The controller executes the predetermined operation when the predetermined display is made on the display portion, and the position detecting portion detects the touched position, and the controller does not execute the predetermined operation when the predetermined display is not made on the display portion due to display failure, and the position detecting portion detects the touched position.

7 Claims, 10 Drawing Sheets

IMAGE FORMING APPARATUS

FIELD OF THE INVENTION AND RELATED ART

The present invention relative to an image forming apparatus such as a printer, a copying machine, a facsimileing machine, and a multifunction machine, that is equipped with a touch panel.

In recent years, there have been proposed image forming apparatuses provided with a touch panel, which is intended to improve the apparatuses in usability. A touch panel displays soft keys which can be touched by a user to make an image forming apparatus perform various operations such as printing photographs, documents, etc., taking in scan data, and the like. A touch panel has: a liquid crystal display, an organic EL (electro-luminescent) display, or the like, which is for displaying various screens such as a screen for a copying operation; and a position detecting portion for detecting the position of the area of the display touched by a user.

A touch panel sometimes suffers from such a problem that its back light does not come on, and therefore, fails to display soft keys (more specifically, image having soft keys) wanted by a user, making it difficult for a user to identify and/or visually recognize the keys. However, even if the display suffers from the above-mentioned problem, the position detecting portion of the touch panel can detect the position of the area of the display touched by a user, unless the position detecting portion itself is malfunctioning. In the past, therefore, an apparatus provided with a touch panel (touch panel for operating heat source, for example) was structured so that if a display is failing to display an image, it is switched in image to an image for dealing with malfunctioning (mode for dealing with malfunction) so that the apparatus can be operated by the touching of the touch panel, in spite of the occurrence of such a problem that the display is failing to display an image (Patent Document 1). In order to do so, the apparatus disclosed in Japanese Laid-open Patent Application No. 2017-199101, for example, is structured so that when it is in the mode for dealing with the display malfunction, the entire surface of the touch panel is assigned to a soft key assigned to a single function (operation), or the touch panel is divided into two or more areas, to which two or more soft keys are assigned one for one.

By the way, such a problem that an image is not displayed on a display could occur to an image forming apparatus equipped with a touch panel. Therefore, it is thinkable to apply the invention disclosed in the aforementioned Japanese Laid-open Patent Application No. 2017-199101, to an image forming apparatus equipped with a touch panel. That is, it is thinkable to design an image forming apparatus equipped with a touch panel, so that even while its display is failing to display an image, it can be operated by the touching of the touch panel by a user. However, if an image forming apparatus having a touch panel is designed so that it can be operated by the touching of the touch panel by a user, even when a user cannot recognize the presence of the soft keys, it is likely for a user to make an operational error. In the case of an image forming apparatus having a touch panel, it is possible that a user will touch the area of the screen of the display, which corresponds to a specific soft key (start key, for example) for starting an operation for forming an image on recording medium. If a user touches the area of the screen of the display, which corresponds to one the soft keys, by mistake), an operation which is not intended by the user is carried out, resulting in the wasteful consumption of recording medium, toner, etc.

SUMMARY OF THE INVENTION

Means for Solving Problems

According to an aspect of the present invention, there is provided an image forming apparatus comprising an image forming portion configured to form a an image on a recording material; a display portion capable of making a predetermined display for accepting, through touch operation, start of a predetermined operation of said image forming apparatus; a position detecting portion capable of detecting a touched position when the touch operation is carried out; and a controller configured to control the predetermined operation on the basis of the touched position detected by said position detecting portion, wherein (i) said controller executes the predetermined operation when the predetermined display is made on said display portion, and said position detecting portion detects the touched position, and (ii) said controller does not execute the predetermined operation when the predetermined display is not made on said display portion due to display failure, and said position detecting portion detects the touched position.

Further features of the present invention will become apparent from the following description of exemplary embodiments with reference to the attached drawings.

DESCRIPTION OF THE EMBODIMENTS

Embodiment 1

<Image Forming Apparatus>

Figure 1:
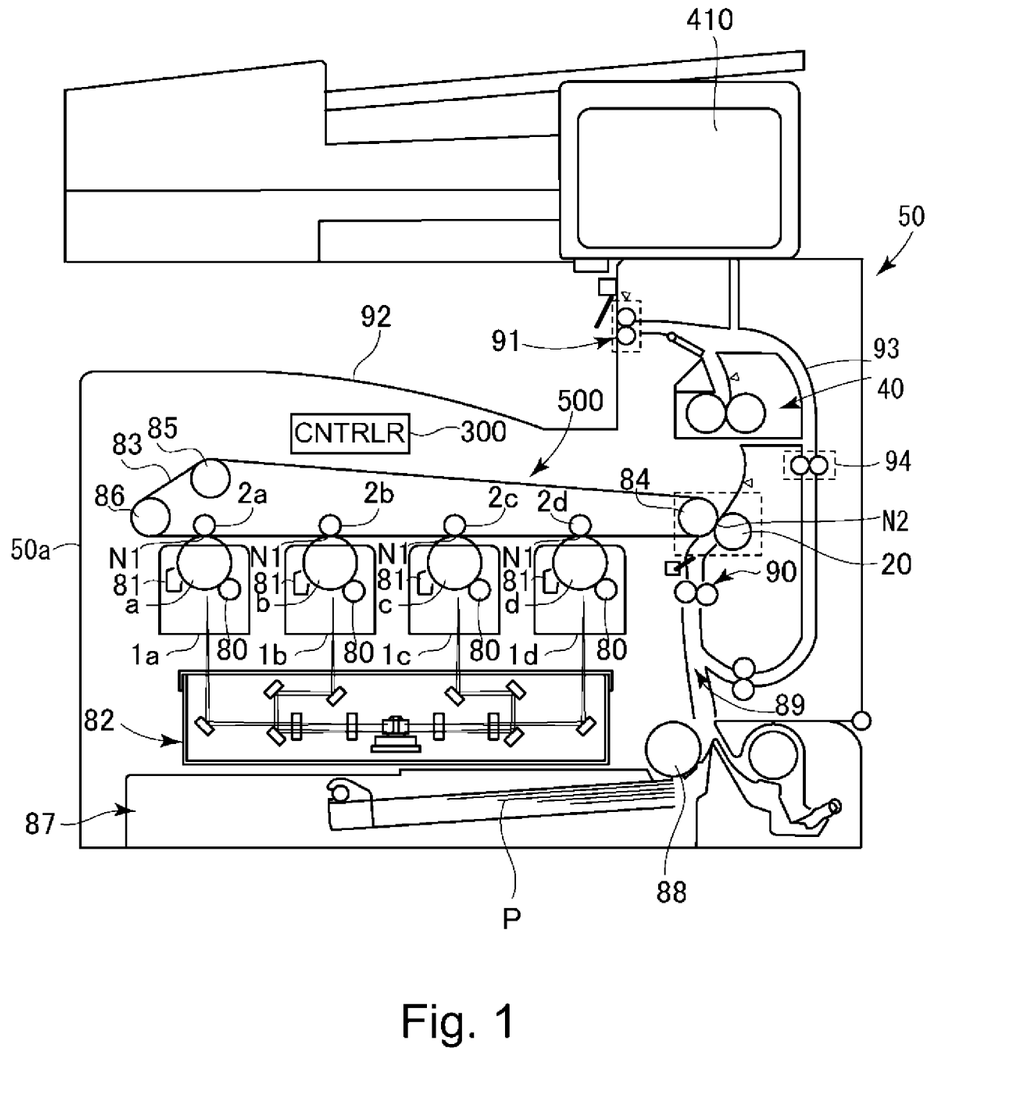
FIG. 1 is a schematic view of a typical image forming apparatus which is in accordance with the present invention.
Figure 2:
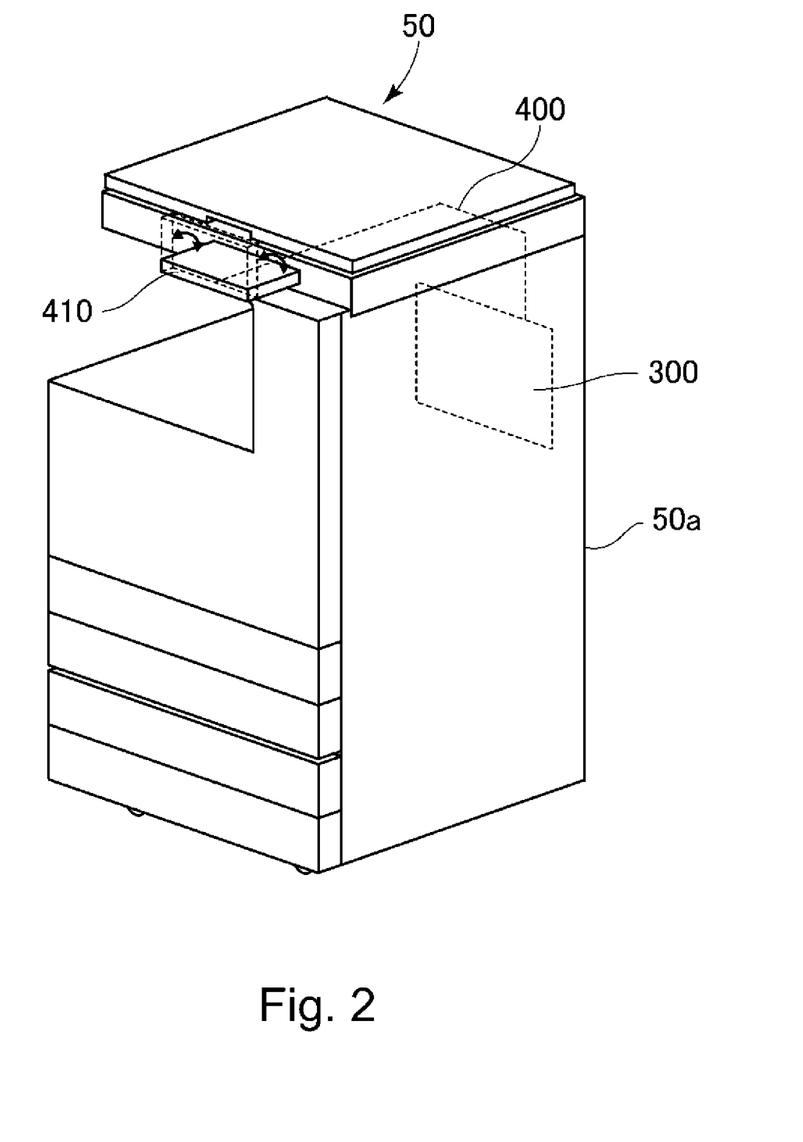
FIG. 2 is a perspective view of the image forming apparatus shown in FIG. 1.

To begin with, referring to FIGS. 1 and 2, the image forming apparatus in this embodiment is described. An image forming apparatus 50 shown in FIG. 1, is a full-color printer of the so-called tandem type. It is cable of forming a toner image on a sheet P of recording medium, based on the image data sent from the external terminal of an original reading apparatus (unshown), a computer, or the like, which is in connection to the main assembly 50*a* of the image forming apparatus 50. In the case of this embodiment, the image forming apparatus 50 has an image formation unit 500 (example of image forming portion) as an image forming means for forming an image on a sheet P of recording medium, in its main assembly 50a. By the way, as examples of recording medium are ordinary paper, cardstock, rough paper, embossed paper, coated paper, glossy paper, photographic paper, plastic film, fabric, etc. can be listed.

Next, the image formation unit 500 is concretely described. The image formation unit 500 is provided with image forming portions 1a, 1b, 1c, and 1d, which are capable of forming yellow, magenta, cyan, and black images, respectively. The image forming portions 1a, 1b, 1c, and 1d are disposed in tandem in the direction parallel to the circumferential direction of the intermediary transfer belt 83 of the image forming apparatus 50. The image forming portions 1a, 1b, 1c and 1d have rotatable photosensitive drums a-d, charging devices 80, and developing devices 81, one for one.

The photosensitive drums a-d are charged by the corresponding charging device 80. Then, they are scanned by (exposed to) a beam of laser light emitted, while being modulated with image data from a laser scanner 32. As a result, an electrostatic latent image which is in accordance with the image data is formed on the peripheral surface of each of the photosensitive drum a-d. Then, the electrostatic latent image on each of the photosensitive drum $a$~d is developed into a toner image by the corresponding developing device 81. Then, each toner image is transferred (primary transfer) onto the intermediary transfer belt 83 by the primary transfer bias applied to primary transfer rollers 2a-2d disposed in a manner to oppose the photosensitive drum a-d, one for one, on the inward side of the loop which the intermediary transfer belt 83 forms, in the primary transfer nip N1.

The intermediary transfer belt 83 is suspended and tensioned by a secondary transfer inside roller 84, and a pair of tension rollers 85 and 86. In this embodiment, the secondary transfer inside roller 84 doubles as a driving roller for driving the intermediary transfer belt 83. A secondary transfer outside roller 20 is positioned so that it opposes the secondary transfer roller 84, with the presence of the intermediary transfer belt 83 between itself and secondary transfer inside roller 84, forming thereby the secondary transfer nip N2 for transferring (secondary transfer) the toner images on the intermediary transfer belt 83 onto a sheet P of recording medium.

In the bottom portion of the image forming apparatus 50, a sheet feeder cassette 87, in which multiple sheets P of recording medium are storable in layers, is disposed. The sheets P of recording medium in the sheet feeder cassette 87 are fed one by one by a feed roller 88 from the sheet feeder cassette 87, into a sheet passage 89. As each sheet P is fed into the sheet passage 89, it is sent to a pair of registration rollers 90 through the sheet passage 89. The pair of registration rollers 90 catches each sheet P while remaining stationary, whereby correcting the sheet P in attitude (if sheet P happens to be being conveyed askew). Then, they convey the sheet P to the secondary transfer nip N2 in synchronism with the formation of the toner images on the intermediary transfer belt 83 by the image forming portions 1a, 1b, 1c and 1d. Then, the secondary transfer bias is applied to the secondary transfer outside roller 20. As the bias is applied, the toner images on the intermediary transfer belt 83 are transferred (secondary transfer) onto the sheet P, in the secondary transfer nip N2. Thereafter, the sheet P is conveyed toward a fixing apparatus 40. In the fixing apparatus 40, the sheet P is conveyed by a pair of rollers, which form a fixation nip, while remaining pinched by the pair of rollers.

While the sheet P is conveyed through the fixation nip, the toner images on the sheet P are heated and pressed. Consequently, the toner images become fixed to the sheet P.

In a case where a toner image is to be formed on only one of the two surfaces of a sheet P of recording medium, the sheet P is discharged onto a delivery tray 92 by a pair of discharge rollers 91, after being conveyed through the fixing apparatus 40. On the other hand, in a case where a toner image is to be formed on both surfaces of the sheet P, the sheet P is conveyed toward a sheet passage 93 for the two-sided mode (switch-backed), by the pair of discharge rollers 91, after being conveyed through the fixing apparatus 40. As the sheet P is sent to the sheet passage 93 the two-side mode it is returned to the sheet passage 89 by a pair of conveyance rollers 94. Then, the sheet P is put through the same process as the one through which a toner image is formed on one of the two surfaces of the sheet P. Thus, a toner image is formed on the other surface of the sheet P. That is, two toner images are formed on both surfaces of the sheet P, one for one, and fixed thereto. Then, the sheet P is discharged onto the delivery tray 92 by the pair of discharge rollers 91.

Figure 3:
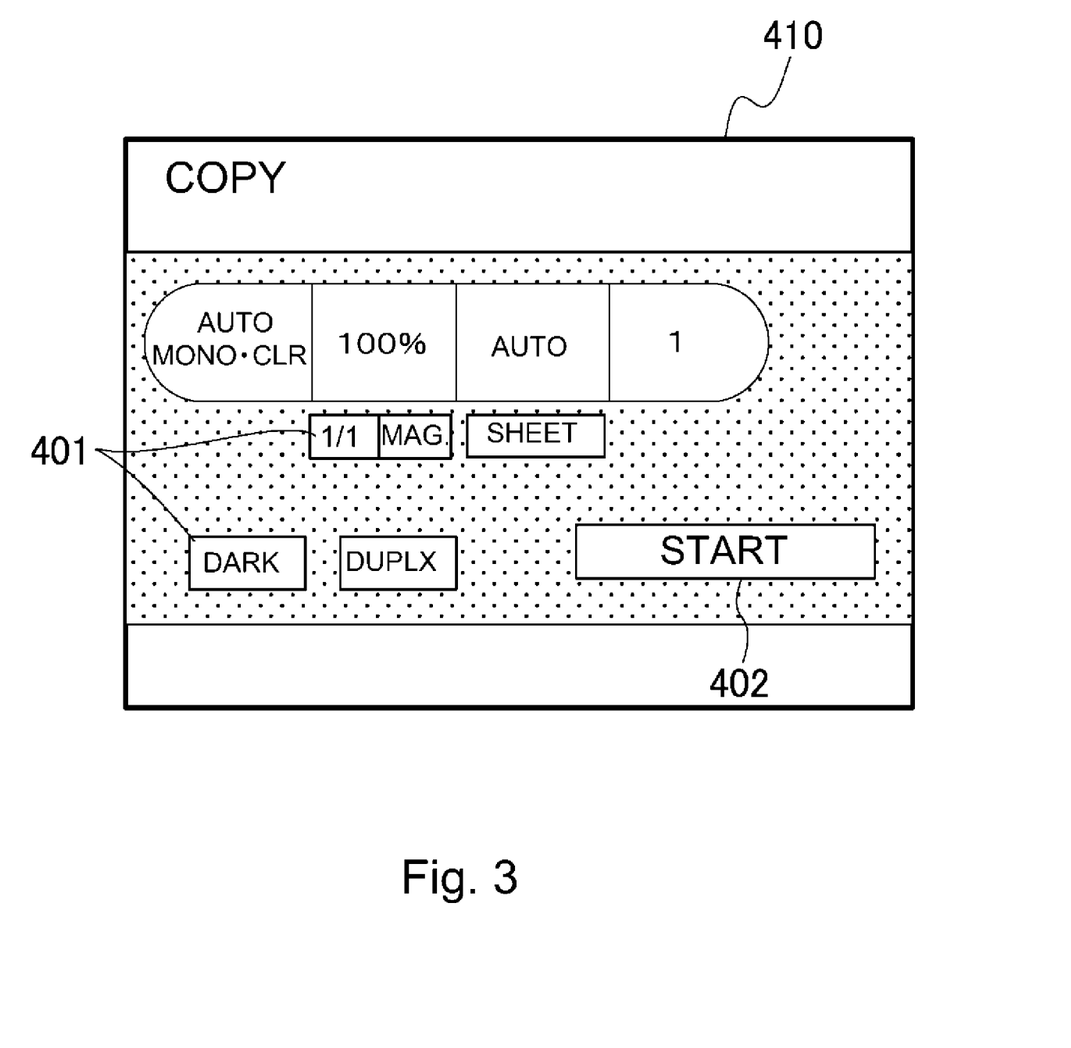
FIG. 3 is a drawing of an example of an image shown on the screen of the display of the image forming apparatus.

The image forming apparatus 50 in this embodiment has a keyless control portion 410, which comprises a liquid crystal display or an organic electro-luminescent display, which is capable of displaying various images for controlling the image forming apparatus 50 in operation. That is, the control portion 410 has soft keys, which resemble in shape actual switches, buttons, a start key, etc. In other words, the keyless control portion 410 is capable of presenting a user with various images for controlling the image forming apparatus 50 in operation. For example, it can display the image for copying operation (FIG. 3). In a case where the control portion is displaying the image which has soft keys, if a user touches one of the soft keys, an operation assigned in advance to the soft key is carried out. That is, the control portion 410 has a touch panel (which sometime may be referred to as touch screen), which a user may touch to operate the image forming apparatus 50. Here, "touching" means that a user touches the touch panel with a finger. The completion of "touching" may be defined as the moment when a user touched the panel with a finger, or moved the finger which is in contact with the panel, away from the panel. Here, therefore, "flicking", "scrolling", or the like also may be thought to be a type of touching.

Referring to FIG. 2, the control portion 410 (example of control portion) as a controlling means is positioned on the front side of the apparatus main assembly 50a, which a user can easily touch when the user is operating the image forming apparatus 50. Further, the control portion 410 is attached to the apparatus main assembly 50a in such a manner that it can be adjusted in angle in the upward, downward, right, and left directions by a tilting mechanism, an angle varying mechanism, or the like. By the way, the image forming apparatus 50 may be structured so that the control portion 410 is attached to the apparatus main assembly 50a in a manner to be replaceable.

Referring also to FIG. 2, the image forming apparatus 50 is provided with a controlling portion 300 for controlling the image forming apparatus 50 in operation. In this embodiment, in order to make it easier to maintain or replace the control portion 410, and also, to make it possible to adjust the control portion 410 in angel and replace the control portion 410, the controlling portion 310 is attached on the rear side of the apparatus main assembly 50a, being positioned away from the control portion 410 positioned on the front side of the apparatus main assembly 50a. The structure and operations of the controlling portion 300 are described later.

Shown in FIG. 3 is an example of image displayed by the control portion 410. The image shown in FIG. 3 is the image for the copying operation. That is, the control portion 410 is displaying an image having input buttons for inputting various settings related to the copying operation, a start key 402 for starting a copying operation, etc. If a user wants the image forming apparatus 50 to operate as a copying machine, the user is to make the control portion 410 display the image for a copying operation, touch input buttons 401 to input various setting for a copying operation, and touch the start key 402. As the start key 402 is touched, the image forming operation is started. That is, the image forming apparatus 50 begins to function as a copying machine, and carries out a copying operation (image forming operation), which includes an operation to read (scan) an original, and an operation to form an image on a sheet P of recording medium (makes copy of original).

<Control Portion>

Figure 4:
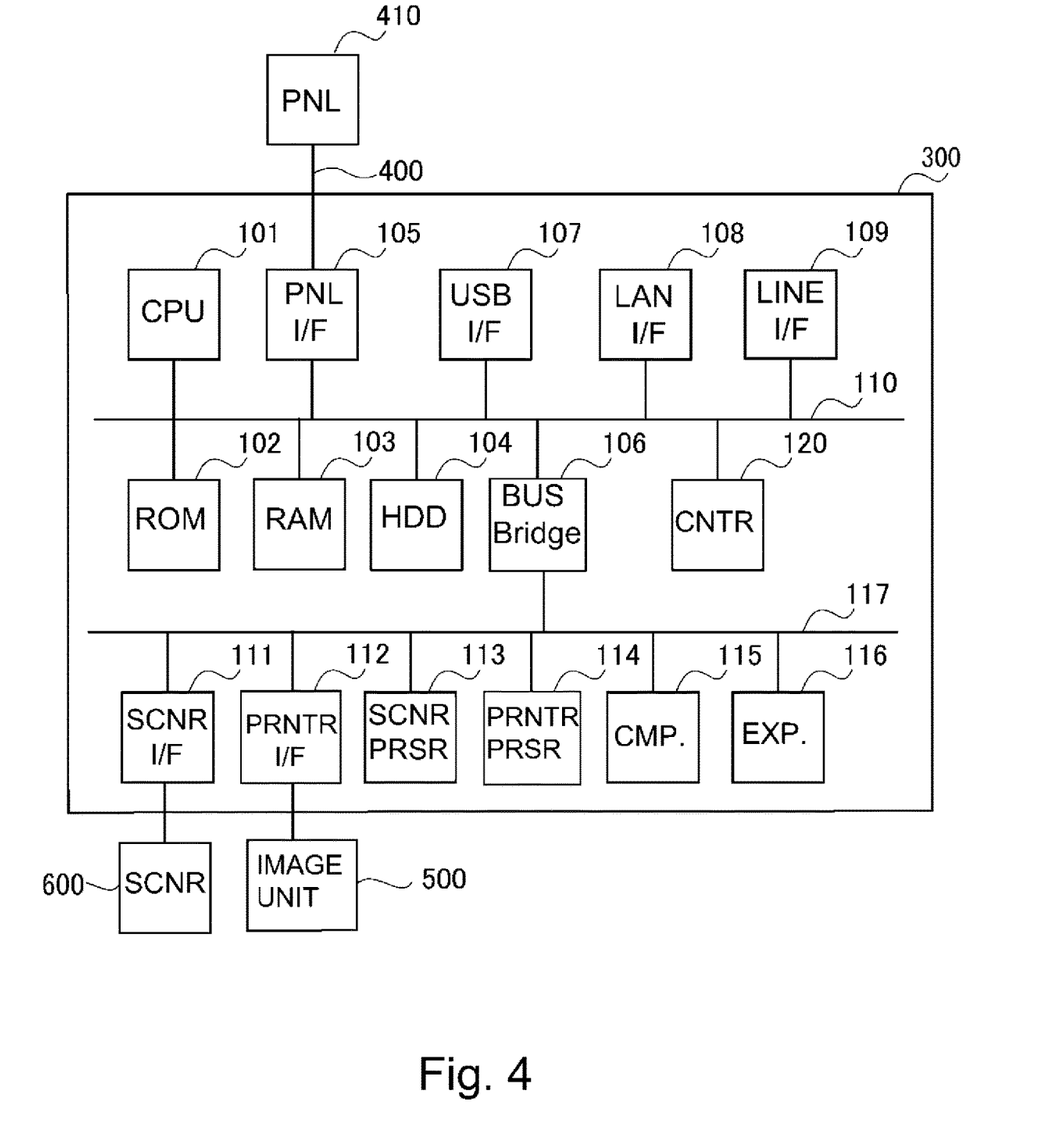
FIG. 4 is a block diagram of the image forming apparatus.
Figure 5:
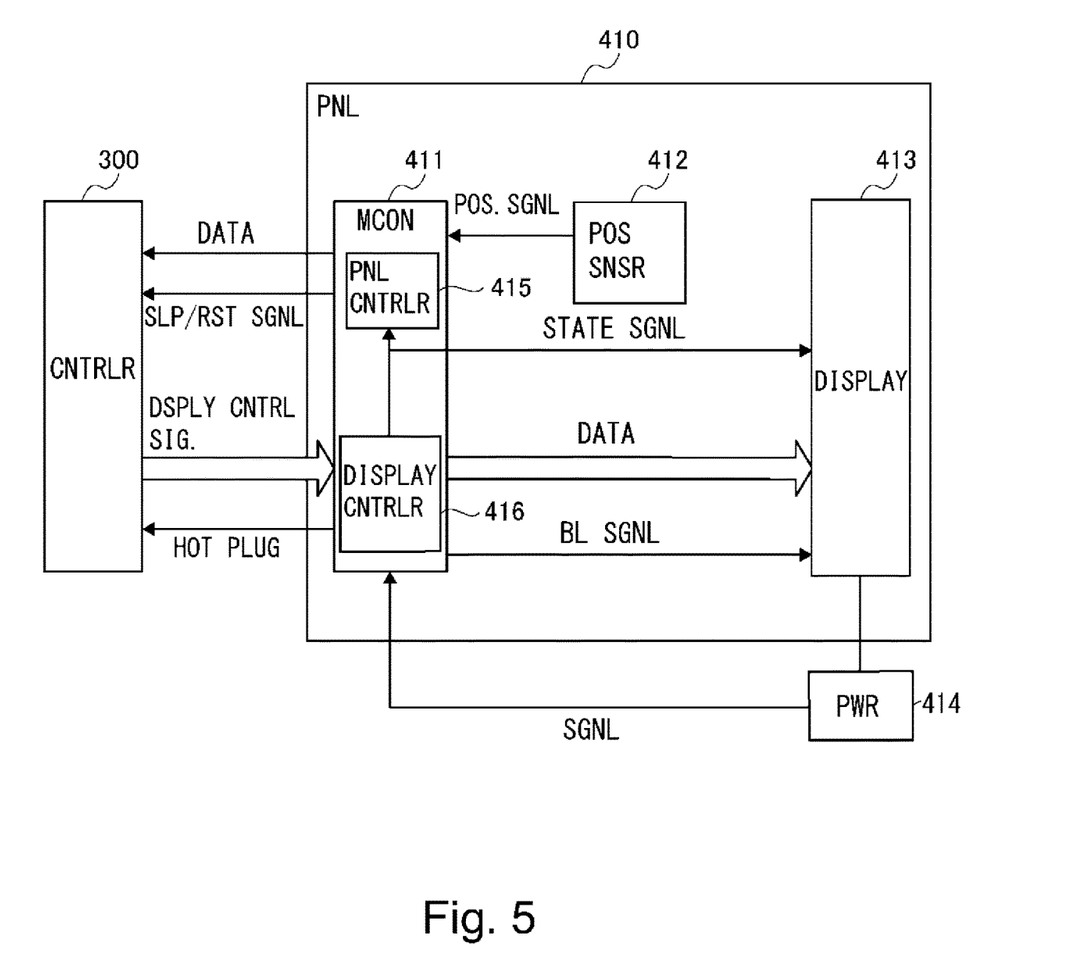
FIG. 5 is a block diagram which shows the signal flow in the image forming apparatus.

Next, referring to FIGS. 4 and 5 along with FIG. 1, the controlling portion 300 as a controlling means, and the control portion 410 as the first controlling portion, are described about their structure and operation. However, to the controlling portion 300 shown in FIG. 4, various devices other than those illustrated in FIG. 4 are connected. For example, a driving power source (motor, electric power source, etc.) for driving various portions is in connection to the controlling portion 300. Here, however, these devices are not related to the main object of the present invention, and therefore, are not illustrated. The controlling portion 300 and control portion 410 are in connection with each other through an interface cable 400 having multiple signal passages, being enabled to transmit or receive data between them. In this embodiment, the interface cable 400 has a signal passage which is relatively high in transmission speed, and a signal passage which is relatively slow in signal transmission speed (serial transmission passage, for example). These signal passages are selectively used based on data type.

The controlling portion 300 as a controlling means is what controls the image forming apparatus 50 in various operations. It has a CPU (Central Processing Unit), a ROM 102 (Read Only Memory), and a RAM 103 (Random Access Memory). In the ROM 102 and RAM 103, various programs and data for controlling the image forming apparatus 50 are stored. For example, the controlling portion 300 can carry out various programs such as an image formation program (process) (unshown), and also, can control the image forming apparatus 50 by carrying out these programs. By the way, the RAM 103 can also temporarily store the data which results as the various programs are carried out, various programs, and various data.

A hard disc drive 104 (HDD) can store system software, various programs, data for forming an image on a sheet P of recording medium, various data for displaying images (inclusive of soft keys) to be displayed by the control portion 410. Also in the hard disk drive 104, the information regarding specific areas of the touch panel are stored in relation to the data related to the soft keys. In this embodiment, the specific area is the area where the start key 402 for making the image forming apparatus 50 to start an image forming operation is displayed. A counter 120 is for counting the sheets P of recording medium on which an image has been formed after the touching of the start key 402 by a user. It generates the information regarding the number of the prints outputted by the image forming apparatus 50, when the number by which prints are to be outputted by a given image forming operation has been set.

The control portion interface 105 (I/F) is an input/output interface through which the control portion 410 transmits or receives various data and signals. For example, it makes the control portion 410 display various image related to the controlling of the image forming apparatus 50, by transmitting to the control portion 410, the data stored in the hard disk 104. It also receives the coordinate data signals generated as the soft keys are touched, and transfers the data to the CPU 101. The CPU 101 can make the image forming apparatus 50 carry out an operation assigned in advance to the touched soft key, based on the transferred coordinate data regarding various operations, for example, the data for changing the control portion 410 in the image to be displayed on its touch panel, or the data for image formation.

The USB interface 107 is an input/output interface through which data are transmitted or received among the USB devices such as an IC reader and a USB memory. A LAN interface 109 is an input/output interface through which data are transmitted or received among various circuit terminals, which are in connection to wireless and wired public communication circuits. In this embodiment, the information generated by the counter 120 is transmitted to external circuit terminals by way of the circuit interface 109. The aforementioned CPU 101, ROM 102, RAM 103, hard disk drive 104, and interfaces, are in connection to each other, by way of a system bus 110, so that data can be transmitted (or received) among them.

A BUS bridge 106 (Bridge) is a bus bridge which is capable of changing data in structure. It connects the system 110 to an image bus 117 which is capable of transmitting or receiving image data at a high speed. The image bus 117 is in connection to a scanner interface 111, a printer interface 112, a scanner image processing portion 113, a printer image processing portion 114, a compressing portion 115, a decompressing portion 116, etc. The scanner interface 111, printer interface 112 are in connection to the scanner 600 (original reading apparatus) and image formation unit 500, and also, are capable of transmitting image data to the CPU 101, or receiving image data from the CPU 101, by way of the BUS bridge 106.

The scanner image processing portion 113 corrects, processes, and edits the image data obtained by the scanning operation of the scanner 600. The printer image processing portion 114 corrects, and changes in resolution, the image data to be used by the image formation unit 500. The compressing portion 116 compresses image data. The decompressing portion 116 decompresses the compressed image data stored in the hard disk drive 104; it restores the compressed data in size.

Referring to FIG. 5, in this embodiment, the aforementioned control portion 410 has a micro-controller 411, a position detecting portion 412, and a display 413. The micro-controller 411, as the second controlling portion, has an operation controlling portion 415 and an image controlling portion 416. The display 413, as an image displaying portion, is in connection to an external power source 414, which supplies the display 413 with the power for turning on a back light (unshown). As the display 413 is turned on, voltage is applied to the display 413, enabling the display 413 to display images. As the display 413 becomes ready to display images, it transmits a hot plug signal to the controlling portion 300. As the power source 414 is turned on, the power source 414 outputs a power signal, and the micro-controller 411 transmits the hot plug signal to the controlling portion 300 in response to the reception of the power source signal. By the way, the micro-controller 411 may be attached to the apparatus main assembly 50a (FIG. 2) in the same manner as the controlling portion 300.

As the controlling portion 300 receives the hot plug signal transmitted from the micro-controller 411, it transmits display controlling signals to the micro-controller 411. The display controlling signals include the back light signals for turning on or off the back light of the display 413, data signals for the images to be displayed by the control portion 410, output timings for these signals, and the like signals. The aforementioned coordinate data signals, hot plug signal, and display controlling signals, are transmitted or received by the controlling portion 300 by way of various signals passages of the interface cable 400 (FIG. 4).

As the display controlling portion 416 normally receives display control signals, it enables (effective) the signals, which show the state of the display 413, to output image data signals to the display 413. Further, the display controlling portion 416 changes the back light signal in state from "inactive" to "active". Thus, a preset image, which indicates that the image forming apparatus 50 is ready to be operated by the touching of soft keys, can be displayed on the display 413. While the preset image is on the display 413, the image forming apparatus 50 can be operated by the touching of the soft keys. Therefore, a user can command the image forming apparatus 50 to start such an operation as a copying operation, by touching an appropriate key among the soft keys on the touch panel (screen) of the display 413. By the way, the preset image indicates nothing but that the image forming apparatus 50 is ready to be operated by the touching of the soft keys by a user. It has no relation to whether the display 413 is ready, or not ready, to display images, that is, it is on or off. If the image forming apparatus 50 is changed in the state of operation from being kept on standby, to being kept asleep as will be described later, the display controlling portion 416 disables (makes ineffective) the signals which indicate the state of the display, and also, switches the back light signal in state so that it becomes inactive. On the other hand, if the image forming apparatus 50, which is being kept in the state of being asleep, is changed in the state of operation so that it will be in the state of being kept on standby, the display controlling portion 416 enables the display state signal, and also, changes the back light signal in state so that the signal becomes active. Further, if the display controlling portion 416 does not normally receive the display control signal, not only does it disable the display state signal, but also, makes the back light signal inactive. In such a case, image data signals are not inputted into the display 413. Therefore, the display 413 is not back lit, and nothing is displayed on the display 413. That is, even though the display 413 is in a state in which it can display the image of a combination of soft keys so that a user can touch the soft keys to operate the image forming apparatus 50, no soft key is displayed on the display 413. In other words, even though the display 413 is in the state in which a user can give such a command as "start copying operation" by touching one of the soft keys, to the image forming apparatus 50, nothing is displayed on the display 413. If the display 413 is in this state, a user is likely to misunderstand that the image forming apparatus 50 is not on, and therefore, it is possible that the user will unintentionally touch the screen of the display 413. If a user touches the screen of the display 413 while the display 413 is in the state described above, it is possible that the image forming apparatus 50 will start carrying out one of the operations, against user's intention. By the way, "one of the operations" means such an operation as the copying operation as described above. The operation in which a beam of laser light is emitted from the laser scanner 83, and the peripheral surface of a photosensitive drum is exposed, is also one of the operations. Here, any of the operations related to image formation may be said to be one of the operations.

As the position detecting portion 412 detects the touching of the display 413 by a user, it outputs a position detection signal (position detection information) to the operation controlling portion 415. That is, as the screen of the display 413 is touched, it is possible that the position detecting portion 412 will electrically detect the position of the area of the screen of the display 413, which has just been touched, and output signals that indicate the area of the screen of the display 413, which has just been touched. As the position detecting portion 412, a position detecting means of the so-called electrostatic capacity type, or a position detecting means of the so-called pressure-sensitive film type, can be used. In this embodiment, a position detecting means of the so-called electrostatic capacity type is used. The operation controlling portion 415 generates coordinate data signals, which specify a coordinate (X, Y) of the touched area of the screen of the display 413, based on the position detection signals outputted by the position detecting portion 412. To the operation controlling portion 415, signals which shows the state of the display 413 have been inputted from the display controlling portion 416. In this embodiment, the micro-controller 411 determines, in response to the signals which show the state of the display 413, whether the coordinate data signals are to be transmitted to the controlling portion 300 or not, as will be described later. If the signals which show the state of the display 413 are in the enabled state, the micro-controller 411 transmits the coordinate data signals to the controlling portion 300. If the signals which show the state of the display 413, are in the disabled state, the micro-controller 411 transmits signals for putting the image formation unit 500 back into the state of being kept asleep, instead of transmitting the coordinate data signals.

Figure 6:
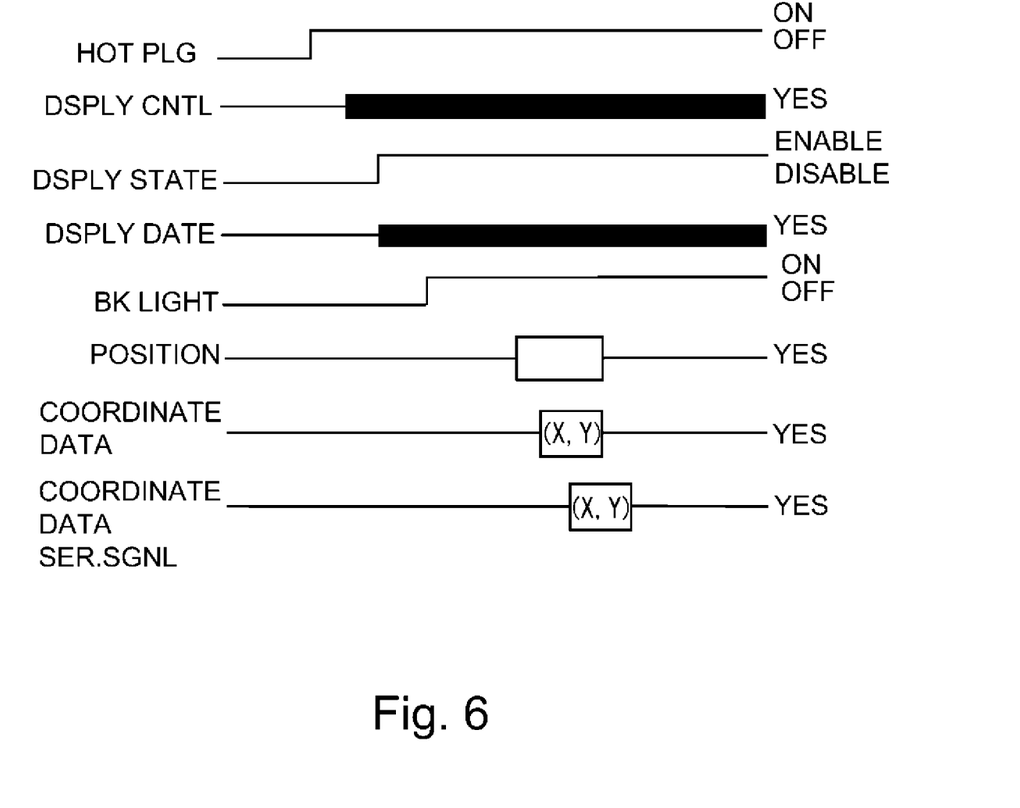
FIG. 6 is a timing chart which shows the timings with which various signals are generated when there is no display malfunction.

FIG. 6 shows the timing with which each of the aforementioned signals is generated when the display 413 is normal in operation. Referring to FIG. 6 along with FIG. 5, as voltage is applied to the display 413 by the power source 414 in response to the activation of the power source, the hot plug signal is activated ("turned on" in Figures). As the controlling portion 300 receives the hot plug signals, the controlling portion 300 generates display data signals, and display control signals which include back light signals, and transmits the signals to the micro-controller 411. As the micro-controller 411 receives the display control signals, it enables the state of display signals, and begins to output the display data signals (activated state). Further, controlling portion 300 activates the back light signals ("On" in drawing). As for the position detecting portion 412, as it detects that a user has touched a given area of the screen of the display 413, it outputs the coordinate data signals which shows the area of the display 413, which has just been touched by a user, as position detection signals, to the micro-controller 411. However, if the signals which show the state of display are enabled, the micro-controller 411 is capable of transmitting the coordinate data signals to the controlling portion 300 as described above.

By the way, if the display 413 is not touched by a user for a preset length of time, or the image formation unit 500 is not operating for a preset length of time, the micro-controller 411 automatically puts the image forming apparatus 50 in the power conservation mode. Further, the image formation unit 500 is changed in the state of operation from being ready (state of standby) for an image formation sequence, and waiting for the reception of a print signal for starting an image forming operation, to being kept asleep. Further, the micro-controller 411 changes the back light signals in state, from being kept active, to being kept inactive. That is, the back light signals are put in the state of being asleep, that is, the state in which the display 413 is less in power consumption, that is, the energy conservation mode, the display 413 is reduced in brightness; the display 413 is put in the power conservation mode, in which the back light is not turned on, and therefore, the image on the screen of the display 413 cannot be read. Even if the image forming apparatus 50 is in the sleep mode, the position detecting portion 412 outputs the position detection signals to the micro-controller 411 in response to the touching of the screen of the display 413 by a user. That is, even if the image forming apparatus 50 is in the state of being asleep, the coordinate data signals are generated. However, in a case where the image forming apparatus 50 is in the state of being kept asleep, the micro-controller 411 does not output the generated coordinate data signals to the controlling portion 300. Instead, it transmits a "wake-up" signal to the controlling portion 300. Thus, the controlling portion 300 changes the image forming apparatus 50 in the state of operation from being asleep, to being on standby, in response to the "wake-up" signal. During this process, the micro-controller 411 changes the back light signals in state from being inactive to being active to turn on the back light. Thus, the display 413 is restored in the state of operation from being unable to display an image to being enabled to display an image.

By the way, the controlling portion 300 and micro-controller 411 are in connection to each other through the interface cable 400 through which the aforementioned various signals are sent and received, as described above. Therefore, for example, if the control portion 410 is repeatedly adjusted in angle, or in the like cases, the interface cable 400 sometimes becomes unsatisfactory in terms of its connection to the controlling portion 300 and/or micro-controller 411, affecting sometimes the image on the display 413.

If the electrical connection between the contact/separation means 30 and micro-controller 411 is unstable, the display 413 is likely to have troubles; the display 413 is likely to fail to properly display the image having the soft keys, based on the display data signals. Even in such a case, as the screen of the display 413 is touched by a user, the position detection signals are outputted. Further, if the electrical connection between the controlling portion 300 and micro-controller 411 is unstable, the display 413 is likely to fail to properly perform; the display 413 is likely to remain unlit, and therefore, the screen of the display 413 is likely to remain too dark to be read. Even in such a case, as the screen of the display 413 is touched by a user, the position detection signals are outputted. That is, the coordinate data signals are generated. In particular, in a case where the control portion 410 is provided with a tilting mechanism and/or a mechanism for varying the control portion 410 in angle as shown in FIG. 2, the control portion 410 is likely to be repeatedly changed in angle by a user, making it possible that the electrical wiring between the controlling portion 300 and micro-controller 411 is repeatedly subject to a certain amount of load. If this wiring portion is severed or damaged, such problems that it becomes impossible for the controlling portion 300 to transmit display control signals to the micro-controller 411, and/or the signals suffer from noises. In such a case, it is possible that the display 411 will fail to properly perform; the display 413 will fail to be back lit.

In the past, it has been possible that as the display 413 fails to properly perform, a user would unintentionally touch one of the soft keys, for example, the soft key for instructing the image forming apparatus 50 to start an image forming operation. Therefore, it has been possible that an image forming operation will have been carried out, even though the user did not intend. Therefore, it has been possible that recording medium, toner, etc., will be wastefully consumed. This problem will occur because the coordinate data signals generated by the touching of the screen of the display 413 by a user are transmitted from the micro-controller 411 to the controlling portion 300.

In this embodiment, therefore, in consideration of the problems described above, the image forming apparatus 50 was structured so that if the display 413 fails to display an image, even if the screen of the display 413 is touched by a user, the coordinate data signals which indicate the position of the area of the screen of the display 413 touched by the user are not transmitted from the micro-controller 411 to the controlling portion 300. Thus, even if the screen of the display 413 is touched by a user when the display 413 is failing to displaying an image, it does not occur that an image forming operation which is unintended by a user is not carried out. The following is the detail of this process.

Figure 7:
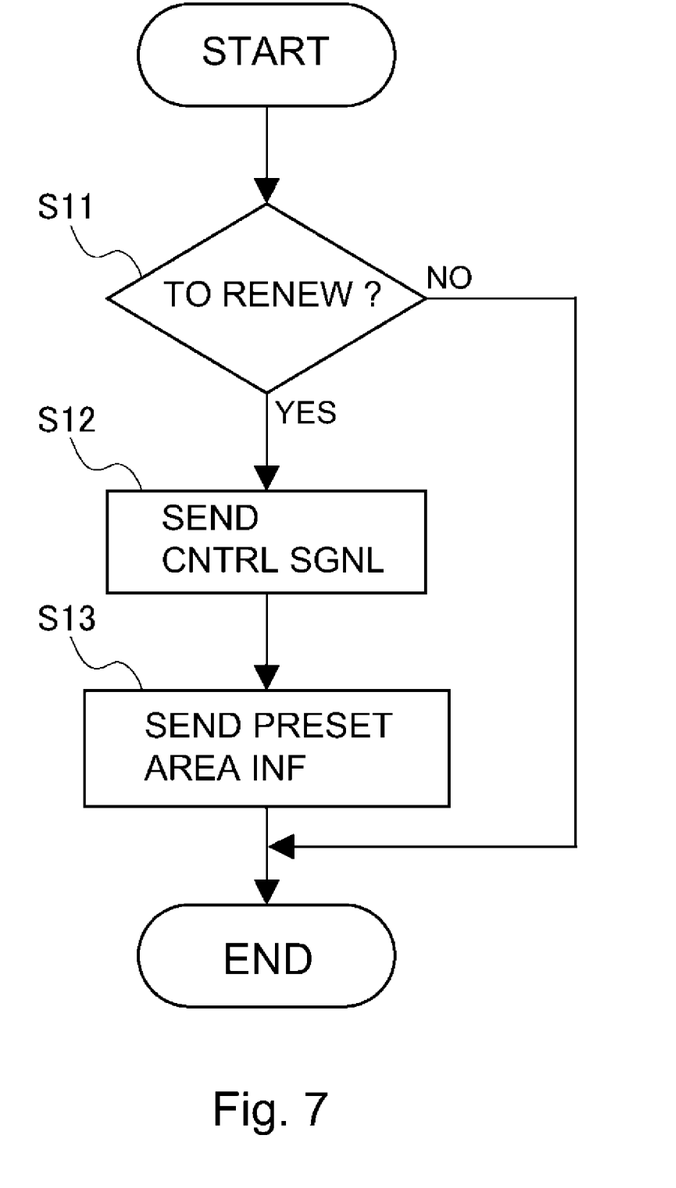
FIG. 7 is a flowchart of the screen refreshment process.
Figure 8:
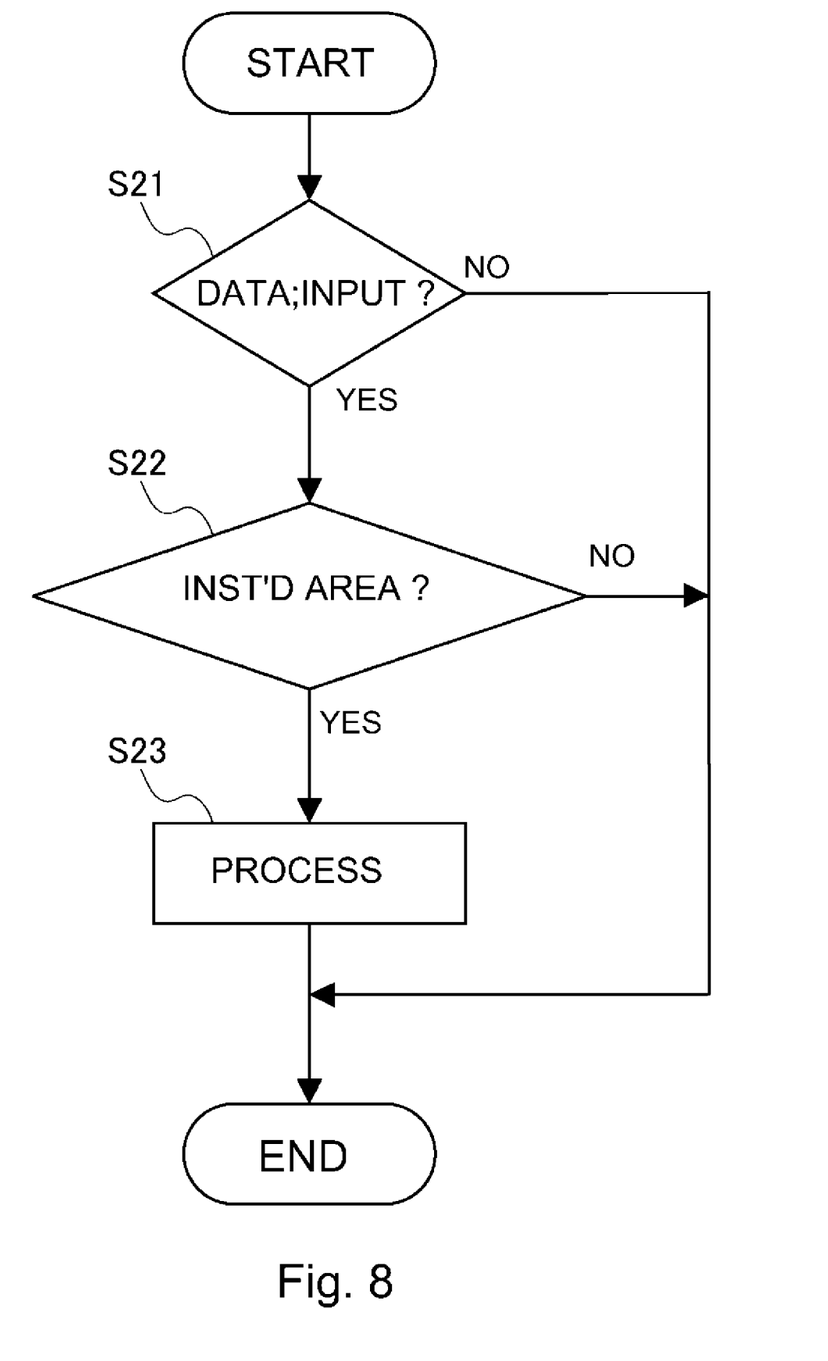
FIG. 8 is a flowchart of the process to be carried out as the touch panel is touched.

To begin with, referring to FIGS. 7 and 8, along with FIGS. 3 and 5, the process to be carried out by the controlling portion 300 is described. FIG. 7 shows the operational sequence for refreshing the image on the display 413. FIG. 8 shows the operational sequence which will occur in response to the touching of the screen of the display 413 by a user. These sequences are started as the power source of the image forming apparatus 50 is turned on. Further, while the image forming apparatus 50 is remaining turned on, they are repeated with preset timing.

As the image forming apparatus 50 is turned on, the controlling portion 300 is enabled to refresh the image on the screen of the display 413, in order to display the initial image on the display 413. Further, if a soft key touched by a user while the image forming apparatus 50 is "On" happens to be the key assigned to the "screen refreshing operation", the controlling portion 300 is enabled to carry out the operation for refreshing the screen. Referring to FIG. 7, the controlling portion 300 will have decided whether or not the operation for refreshing the screen to be carried out (S11). In a case where the operation for refreshing the screen of the display 413 does not need to be carried out (No in S11), the controlling portion 300 ends this process for refreshing the screen. In a case where the image on the display 413 needs to be refreshed (Yes in S11), not only does the controlling portion 300 read out the display data from the hard disk drive 104, and refresh the screen, but also, generates display control signals, and transmits them to the control portion 410 (which in reality is micro-controller 411) (S12). In addition, when the controlling portion 300 transmits the display control signals, it transmits the information related to the specific area associated with the display data, to the control portion 410 by way of the signal passage (serial communication passage) of the interface cable 400 (S13). In this embodiment, the information related to the specific area is such information that is related to the area of the screen of the display 413, across which the start key 402 (FIG. 3) is displayed.

Next, referring to FIG. 8, as a soft key is touched (S21) the controlling portion 300 determines whether or not it received from the control portion 410 (micro-controller 411 in reality), the coordinate data signals transmitted thereto. In a case where it has not received the coordinate data signals from the control portion 410 (No in S21), it ends the process related to the touching of the screen of the display 413. In a case where it determined that it has received the coordinate data signals from the control portion 410 (Yes in S21), it determines whether or not the received coordinate data signals (obtained coordinate) indicates the area of the screen of the display 413, across which the soft key is displayed (S22). More concretely, the controlling portion 300 determines whether or not the received coordinate data signals are such signals that shows a position in the area of the screen of the display 413 across which the soft key is displayed. In a case where the coordinate data signals are not such signals that are not related to a position within the area across which the soft key related to operational commands (No in S22), the controlling portion 300 ends the process started by the touching of the screen of the display 413. In a case where the received coordinate data signals are such that indicate the area across which the soft key related to the operational command is displayed (Yes in S22), the controlling portion 300 makes the image forming apparatus 50 carry out the operation assigned to the soft keys in the area indicated by the coordinate data signals (S23). In this embodiment, in a case where the coordinate data signals are such that indicate the area of the screen of the display 413, across which the start key 402 (soft key) is displayed, the controlling portion 300 makes the image formation unit 500 carry out an image forming operation. In a case where the coordinate data signals are such that the area of the screen of the display 413 across which one of the other input soft keys than the start key, for example, an input soft key 402 (button), the controlling portion 300 can make the image forming apparatus 50 carry out the operation for refreshing the screen, for example.

Figure 9:
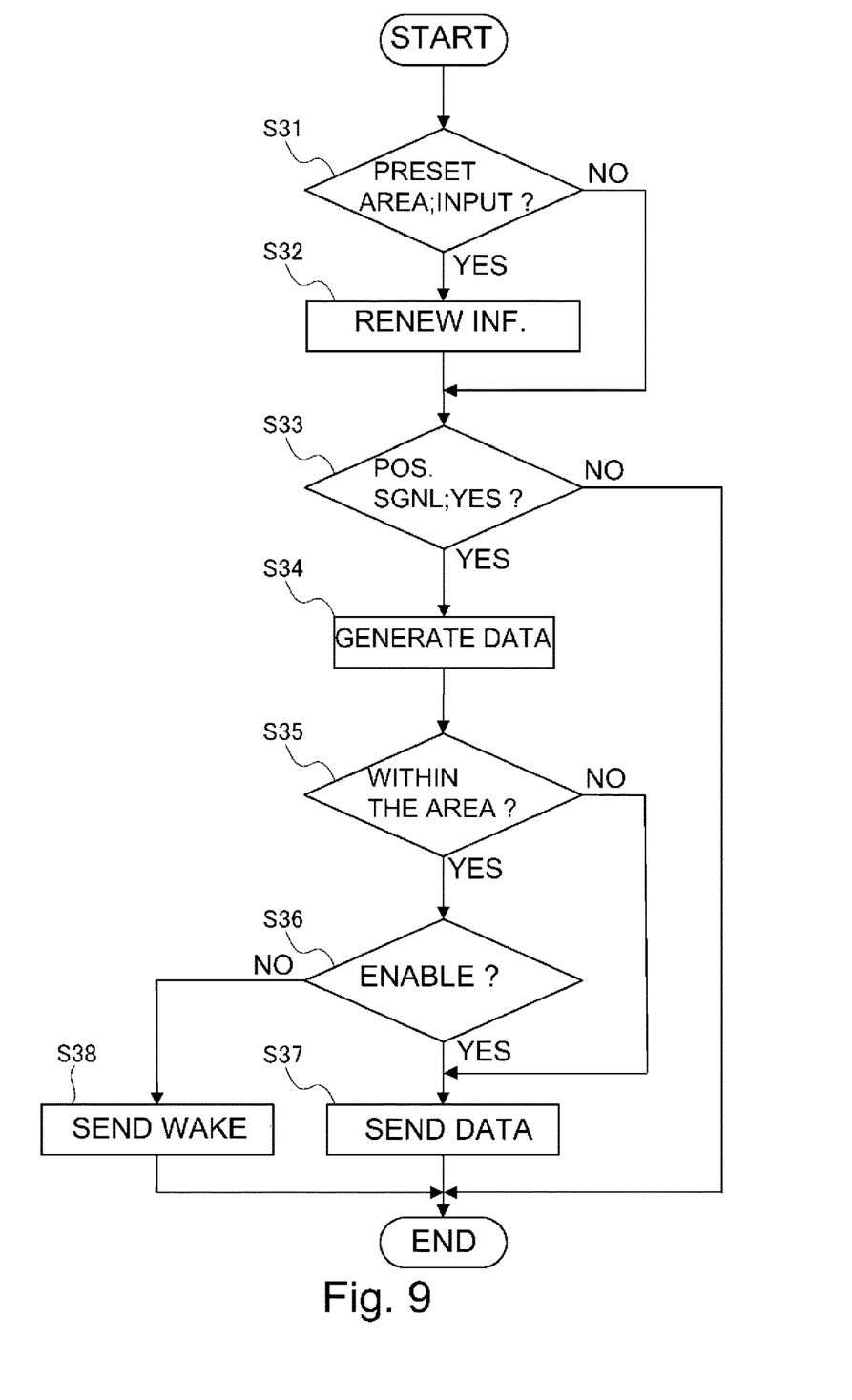
FIG. 9 is a flow chart of the process to be carried out as the touch panel is touched.

Next, referring to FIG. 9 along with FIGS. 3 and 5, the process for controlling the control portion, which is repeatedly carried out with preset timing by the control portion 410 (micro-controller 411), is described. Referring to FIG. 9, the micro-controller 411 determines whether or not it has received from the controlling portion 300, the information which indicates a specific area of the screen of the display 413 (S31). In a case where it determines that it has not received the information (No in S31), the micro-controller 411 jumps to the step S33. If it determines that it has received the information (Yes in S31), it stores the received information in its memory area. During this process, if information which indicates a specific area of the screen of the display 413 is already in the memory area, the micro-controller 411 replaces the information in the memory area with the received information which indicate the specific area of the screen of the display 413 (S32).

Then, the micro-controller 411 determines whether or not it has received position detection signal from the position detecting portion 412 (S33). In a case where it determines that it has not received the position detection signals (No in S33), the micro-controller 411 ends this process of controlling the control portion. On the other hand, in a case where it determines that it has received the position detection signals (Yes in S33), it generates coordinate data signals which indicate the area of the screen of the display 413 touched by a user, based on the received position detection signals (S34). Then, the micro-controller 411 determines whether or not the generated coordinate data signals match the information which is in the memory area and indicates a specific area of the screen of the display 413 (S35). More concretely, it determines whether or not the received coordinate data signals match the data in the memory area, which indicate the area of the screen of the display 413, across which the start key is displayed.

In a case where the received coordinate data signals are not such that indicate to the area of the screen of the display 413 stored in the memory area (No S36), the micro-controller 411 jumps to Step S37, in which the micro-controller 411 transmits the generated coordinate data signals to the controlling portion 300. In this embodiment, in a case where the coordinate data signals do not match the signals which are in the memory area and indicate the specific area of the screen of the display 413, such data signals that indicate the position of the area of the screen of the display 413 which corresponds to one of the soft keys other than the start key 402, are transmitted.

In a case where the received coordinate data signals match the information which is in the memory area and match a specific area, if the key touched by a user is the start key 402 (Yes in S35), the micro-controller 411 determines whether or not the signals which indicate the state of the display 413 are enabled or disabled (S36). In a case where the micro-controller 411 determines that the signals are enabled (Yes in S36), the micro-controller 411 transmits the coordinate data signals to the controlling portion 300 (S37), and ends this process of controlling the controlling portion. In this case, the controlling portion 300 receives the coordinate data signals, and makes the image forming apparatus 50 start an image forming operation, in response to the image formation operation start command assigned to the start key 402 (FIG. 8).

On the other hand, in a case where the signals which indicate the state of the display 413 are disabled (No in S36), the micro-controller 411 transmits signals for putting the image forming apparatus 50 to sleep, to the controlling portion 300 (S38). Then, it ends the process of controlling the controlling portion. That is, in a case where the signals which indicate the state of the screen are disabled, even if the start key 402 is touched by a user, the micro-controller 411 does not transmit the coordinate data signals to the controlling portion 300. In this case, the controlling portion 300 does not receive the coordinate data signals. Therefore, even if the start key 402 is touched by a user, the controlling portion 300 does not issue an image formation operation start signal assigned to the start key 402. Therefore, an image forming operation is not started. However, the micro-controller 411 transmits a "wake-up" signal. Therefore, the image forming apparatus 50 is switched in the state of operation from being kept asleep to being kept on standby. By the way, in case where the image forming apparatus 50 receives a "wake-up" signal from the micro-controller 411 while it is kept on standby, the controlling portion 300 ignores the "wake-up" signal.

As described above, in a case where position detection signals are inputted in response to the touching of the display 413 by a user while the signals which indicate the state of the display 413 are enabled, the micro-controller 411 transmits to the controlling portion 300, the coordinate data signals generated in response to the position detection signals. Further, in a case where the position detection signals are inputted in response to the touching of the screen of the display 413 by a user while the signals which indicate the state of the display 413 are disabled, the micro-controller 411 transmits to the controlling portion 300, a "wake-up" signal, instead of coordinate data signals.

Figure 10:
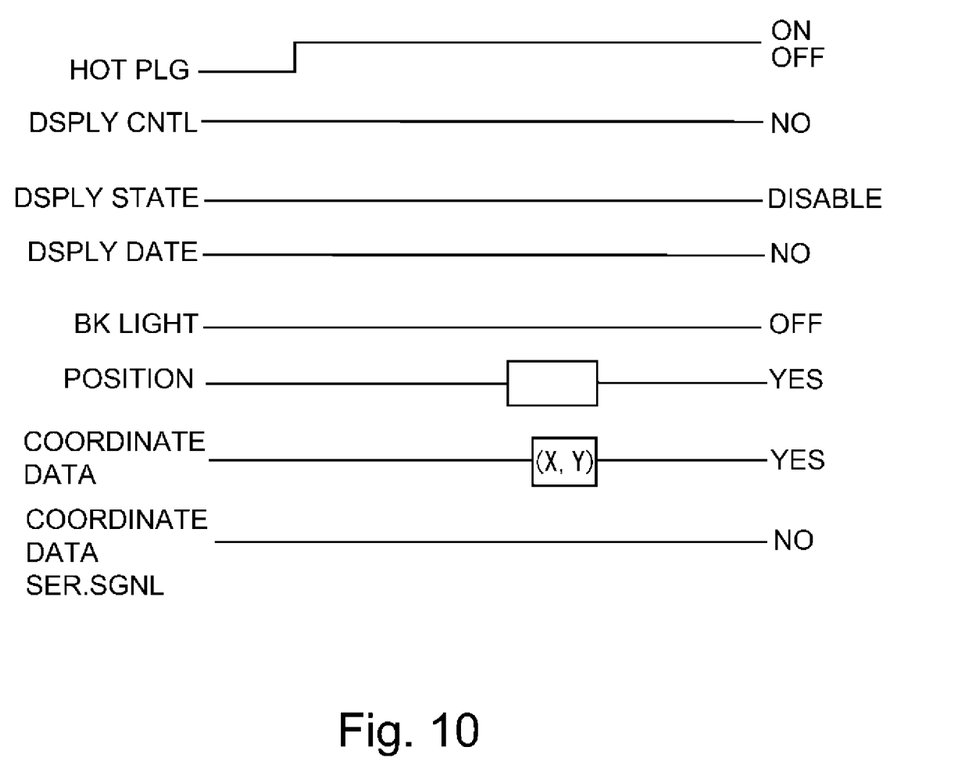
FIG. 10 is a timing chart for various signals which are generated when the display is failing to display a preset image.

FIG. 10 shows the timings with which the aforementioned various signals are generated while the display 413 is failing to display an image. Referring to FIG. 10 along with FIG. 5, as the power source of the display 413 is turned on, whereby voltage is applied to the display 413 by the power source 414, a hot plug signal is activated ("On" in drawings). As the controlling portion 300 receives the hot plug signal, it generates the display data signals, and display control signals which includes the back light signal, and transmits the signals to the micro-controller 411. As the micro-controller 411 receives the display control signals, it is expected to enable the signals which indicate the state of the display 413, begin to output the display data signals, making thereby the display 413 active, and activate the back light signal, as described above. However, if the interface cable 400 is suffering such a problem as a bad connection, it is difficult for the micro-controller 411 to receive display control signals. In such a case, outputting of the display data signals, is not started. Therefore, the display 413 does not display any image. Further, in a case where the display 413 does not show any image, the signal which indicates the state of the display 413 is not enabled, remaining therefore disabled, and the back light signal becomes inactive ("Off" in drawing).

Even if the image forming apparatus 50 (display 413) is in the state described above, as the position detecting portion 412 detects the touching of the screen of the display 413 by a user, it outputs to the micro-controller 411. coordinate data, as position detection signals, which indicate the area of the screen of the display 413 touched by the user. However, in a case where the start key 402 (FIG. 3) is touched, if the signals which indicate the state of the display 413 are enabled, the micro-controller 411 transmits coordinate data signals to the controlling portion 300. However, in a case where the signals which indicate the state of the display 413 remain disabled, it does not transmit the coordinate data signals to the controlling portion 300. That is, while the signals which indicate the stage of the display 413 remain disabled, in other words, while the display 413 is not displaying any image, the micro-controller 411 does not transmit coordinate data signals to the controlling portion 300. Therefore, even if the area of the screen of the display 413, which corresponds to the start key 402 (FIG. 3), for example, is touched by a user while the display 413 is failing to display an image, the image formation unit 50 does not carry out an image forming operation.

As described above, in this embodiment, in a case where the display 413 is failing to display an image, as the area of the screen of the display 413, which corresponds to the start key 402, is touched by a user, the micro-controller 411 receives position detection signals. However, it does not transmit coordinate data signals to the controlling portion 300. Therefore, in a case where the display 413 is failing to display an image, even if the area of the screen of the display 413, which corresponds to the start key 402, is touched, the controlling portion 300 does not make the image forming apparatus 50 carry out an image forming operation. Therefore, in a case where the display 413 is failing to display an image, even if the area of the screen of the display 413, which corresponds to the start key 402, for example, is touched, the controlling portion 300 does not make the image forming apparatus 50 carry out an image forming operation. That is, while the display 413 is failing to display an image, even if a user unintentionally touches the area of the screen of the display 413, which corresponds to the start key 402, it does not occur that an image forming operation, which is unintended by a user, is carried out. Therefore, it does not occur that while the display 413 is failing to display an image, recording medium, toner, etc., are wastefully consumed. Further, it does not occur that such an erroneous operation that the counter is increased in value due to an operation which is unintended by a user and carried out while the display 413 is failing to display an image.

Further, in this embodiment, in a case where a user touches the screen of the display 413 while the signals which indicate the state of the screen are remaining disabled, the micro-controller 411 transmits to the controlling portion 300, a "wake-up" signal, instead of coordinate data signals. Therefore, it is ensured, with the employment of relatively simple structure, that the image forming apparatus 50 is changed in the state of operation from being kept asleep to being kept on standby. Further, it is possible to prevent the problem that the image forming apparatus 50 erroneously operates while the display is failing to display an image.

By the way, the preceding embodiment of the present invention is not intended to limit the present invention in scope in terms of the structure of an image forming apparatus. That is, as long as an image forming apparatus is structured so that while the display 413 is failing to display an image, the touching of the screen of the display 413 by a user is ignored, the control portion 410 may be differently structured from the above described one. For example, the image forming apparatus 50 may be structured so that as long as the image forming apparatus 50 is in the mode in which it is not put to sleep, in a case where the signals which indicate the state of the display of the display 413 are remaining disabled, a "wake-up" signal is not transmitted to the controlling portion 300. In such a case, as long as the signals which indicate the state of the screen of the display 413 are remaining disabled, the micro-controller 411 can determine that the display 413 is failing to display an image. Therefore, it is possible to prevent the image forming apparatus 50 from erroneously operate, by structuring the image forming apparatus 50 so that even in a case where the position detecting portion 412 detects the touching of the screen of the display 413 by a user, the micro-controller 411 does not transmit a "wake-up" signal or coordinate data signals. By structuring the image forming apparatus 50 as described above, it is possible to prevent the problem that an image forming operation which is unintended by a user is carried out, and therefore, recording medium, toner, and the like are wastefully consumed.

By the way, in the embodiment described above, the image forming apparatus 50 was structured so that while the display 413 is failing to display an image, it does not occur that an image forming operation which is unintended by a user is carried out. An image forming apparatus may be differently structured from the image forming apparatus 50 in the preceding embodiment, so that it can prevent other operations from being carried out, as long as it is structured so that it can prevent the problem that while its display is failing to display an image, it erroneously operates. For example, it is possible to structure an image forming apparatus to prevent the problem that a wrong (unintended) operation of an image forming apparatus, such as transmission of the data obtained by the reading of an original, and fax transmission, is initiated by the unintended touching of the screen of the display 413 of the control portion 410 by a user.

According to this embodiment, which is related to the structure for an image forming apparatus, it is possible to easily prevent the problem that in a case where an image forming apparatus having a display which is touchable to operate the image forming apparatus is suffering from the problem that its display is failing to display a preset image, as the position of a given area of the screen of the display, which has just been touched by a user, is detected, the operation which corresponds to the touched area is carried out by the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-110635 filed on Jun. 13, 2019, which is hereby incorporated by reference herein in its entirety.

What is claimed is:

1. An image forming apparatus comprising:
   an image forming portion configured to form an image on a recording material;
   an operation unit provided with a touch panel display capable of making an operation display for accepting, through touch operation by a user, start of a predetermined operation of said image forming apparatus and a back light configured to illuminate the touch panel display to visualize the operation display;
   a position detecting portion capable of detecting a touched position when the touch operation is carried out; and
   a controller configured to control the predetermined operation on the basis of the touched position detected by said position detecting portion,
   wherein (i) said controller executes the predetermined operation when the operation display is made on said touch panel display, and said position detecting portion detects the touched position, and (ii) said controller does not execute the predetermined operation when the back light could not illuminate said touch pane display due to back light failure, and said position detecting portion detects the touched position.

2. The image forming apparatus according to claim 1, further comprising a voltage source configured to supply electric power to the back light, wherein (i) in a case that said image forming apparatus is kept at rest for a predetermined period of time, said controller controls said voltage source to change said touch panel display from a state in which the touch operation is possible to a power saving state in which light from said back light to illuminate said touch panel display is darker than in the state in which the touch operation is possible, (ii) in a case that the touch operation is carried out on said touch panel display in the electric power saving state, said controller is capable of controlling said voltage source to change said touch panel display from the power saving state to the state in which the touch operation is possible, the light from said back light to illuminate said touch panel display being brightened.

3. The image forming apparatus according to claim 1, wherein said controller includes a first controller configured to control said image forming portion, and a second controller configured to control said touch panel display and said position detecting portion, and said first controller is capable of controlling an image forming operation of said image forming portion on the basis of position detection information, sent from said second controller, indicative of the touched position detected by said position detecting portion, wherein said second controller is connected with said first controller so as to be capable of sending and receiving data, and wherein the position detection information is sent to said first controller in no back light failure, and the position detection information is not sent to said first controller in back light failure.

4. The image forming apparatus according to claim 1, wherein the operation display indicates a soft key the touch panel display, wherein said controller executes the predetermined operation when the soft key is displayed on said touch panel display, and the touched position detected by said position detecting portion corresponds to an area of said soft key.

5. The image forming apparatus according to claim 4, wherein the predetermined operation is an image forming operation of said image forming portion and the recording material.

6. The image forming apparatus according to claim 5, wherein said controller counts the number of recording materials on which images of formed by said image forming portion in response to an operation of the soft key and generates information relating to billing in accordance with the number of the counted the recording materials.

7. The image forming apparatus according to claim 1, wherein said operation unit is tilted to an attached portion of a main body of said image forming apparatus.

* * * * *